United States Patent Office 3,389,184
Patented June 18, 1968

3,389,184
NOVEL PROCESS FOR THE PREPARATION OF 2,4-DINITRO-6-CHLOROMETHYL-PHENOL
Manfred Becher, Richard Sehring, and Karl Zeile, Ingelheim, Germany, assignors to C. H. Boehringer Sohn, Ingelheim am Rhein, Germany, a limited partnership of Germany
No Drawing. Filed Feb. 21, 1964, Ser. No. 346,389
Claims priority, application Germany, Mar. 4, 1963, B 70,986
3 Claims. (Cl. 260—622)

This invention relates to a novel process for the preparation of 2,4-dinitro-6-chloromethyl-phenol of the formula

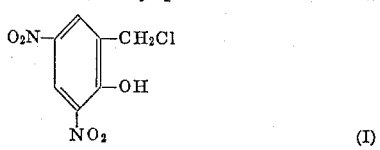

which has useful pesticidal properties and is described in copending application Ser. No. 333,180, filed Dec. 24, 1963.

In said copending application a method of preparing 2,4-dinitro-6-chloromethyl-phenol is described, which comprises reacting 2,4-dinitro-6-hydroxymethyl-phenol with thionyl chloride at the boiling point of the reaction mixture, according to the following reaction equation:

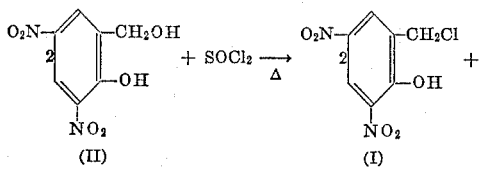

While this is a simple procedure with an average yield of 90%, the preparation of the starting compound, that is, 2,4-dinitro-6-hydroxymethyl-phenol, involves a series of chemical reactions which are not only relatively difficult to perform but also substantially reduce the overall yield of the desired end product by virtue of the fact that some of the individual reactions produce very low yields of the intermediate products.

More particularly, it is well known [F. D. Chattaway and H. Irving, J. Chem. Soc. (London) 1934, 325–330] that 2,4-dinitro-6-hydroxymethyl-phenol (II) is prepared from p-nitro-phenol by a sequence of reactions involving four separate steps which may be schematically represented as follows:

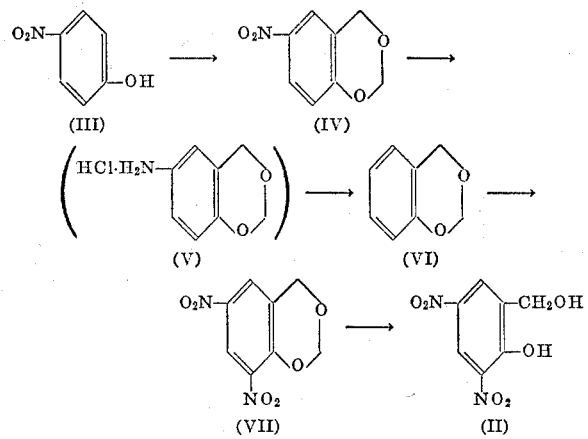

Step 1: III→IV. Condensation of p-nitro-phenol with formaldehyde in concentrated sulfuric acid by the method of Borsche and Berkhout. Yield: 86% [W. Borsche and A. D. Berkhout, Liebigs Annalen der Chemie, 330, 91 (1903)].

Step 2: IV→VI. Reduction of the nitro group into the amino group and subsequent diazotization and reduction to benzodioxane-1,3 without isolation of the intermediate amino compound (V), by the method of Chattaway et al. Yield: 24% [F. D. Chattaway and F. Calvet, Anales Soc. Espanola Fisica, Quim. 26, 417–420 (1928), abstracted in Chem. Zentralblatt 1929 I, 2057; and F. D. Chattaway, H. Irving and M. Goepp, J. Chem. Soc. (London) 1931, 2492–2494].

Step 3: VI→VII. Dinitration of benzodioxane-1,3 by the method of Chattaway et al. Yield: 60% [F. D. Chattaway, H. Irving and M. Goepp, J. Chem. Soc. (London) 1931, 2492–2494].

Step 4: VII→II. Cleavage of the dioxane ring with an alkali by the method of Chattaway and Irving. [F. D. Chattaway and H. Irving, J. Chem. Soc. (London) 1934, 325–330]. The yield of this reaction is not given in the literature, but our own tests have shown it to be 90%.

Thus, the overall yield of 2,4-dinitro-6-hydroxymethyl-phenol, based on the amount of p-nitrophenol originally used, is about 11% and the overall yield of 2,4-dinitro-6-chloromethyl-phenol on the same basis is only about 10%.

From the foregoing facts it is quite evident that the method presently available for the preparation of 2,4-dinitro-6-chloromethyl-phenol from p-nitrophenol is highly uneconomical and therefore does not lend itself to large-scale industrial application.

It is an object of the present invention to provide a process for the preparation of 2,4-dinitro-6-chloromethyl-phenol from p-nitro-phenol which involves substantially fewer reaction steps and produces considerably higher yields of the desired end product.

Other objects and advantages of the invention will become apparent as the description proceeds.

The above objects are achieved, according to the present invention, by first subjecting p-nitro-phenol to a chloromethylating reaction, and thereafter subjecting the 4-nitro-6-chloromethyl-phenol obtained thereby to a nitration reaction with nitric acid. The first step produces 4-nitro-6-chloromethyl-phenol with an average yield of about 62% based on the amount of p-nitrophenol, and the second step produces 2,4-dinitro-6-chloromethyl-phenol with a yield of about 90%, based on the amount of 4-nitro-6-chloromethyl-phenol.

Thus, in contradistinction to the five-step low yield prior art method of preparing 2,4-dinitro-6-chloromethyl-phenol, the process according to the present invention requires only two reaction steps and, moreover, yields the desired end product in amounts averaging about 63%, based on the amount of p-nitro-phenol originally used, which represents a better than six-fold increase over the yield of the lengthy and circuitous prior art method.

The first step of the process according to the present invention, namely, the chloromethylation of p-nitro-phenol is not new as such; by itself, it has been described in Organic Synthesis 20, 59 (1949).

The second step, namely, the nitration of 4-nitro-6-chloromethyl-phenol, is new and has never before been described. In addition to being novel, the reaction has certain surprising and unexpected aspects.

First, knowing of the chloromethylation of p-nitro-phenol from Organic Synthesis, the obvious solution to the problem of providing a shorter, more efficient procedure for the preparation of 2,4-dinitro-6-chloromethyl-phenol from p-nitrophenol would have been to nitrate p-nitro-phenol first to obtain 2,4-dinitro-phenol and thereafter subjecting the latter to the chloromethylation reaction according to Organic Synthesis to obtain the desired end product. However, the chloromethylation reaction is not applicable to 2,4-dinitro-phenol; chloro-methylation of 2,4-dinitro-phenol by the method described in Organic Synthesis, supra, will not produce the desired end product.

On the other hand, it is well known that the chlorine atom in 4-nitro-6-chloromethyl-phenol is rather reactive, as evidenced by the fact that, even at room temperature, 4-nitro-6-chloromethyl-phenol readily hydrolyzes in water into 4-nitro-6-hydroxymethyl-phenol. Consequently, it would reasonably have been expected that upon nitration the chlorine would be replaced by either —ONO₂ in the case of fuming nitric acid or —OH in the case of aqueous nitric acid. Instead, however, the nitration takes place at the ring carbon atom adjacent to that carrying the phenolic hydroxyl group, and the chloromethyl group remains undisturbed.

Thus, the present invention provides a simple, efficient, relatively inexpensive and direct method for the preparation of 2,4-dinitro-6-chloromethyl-phenol which is readily adaptable to large-scale industrial application with relatively simple chemical process apparatus.

The following examples further illustrate the present invention and will enable others to understand it more completely. It should be understood, however, that the invention is not limited to the particular examples given below.

EXAMPLE 1

20.0 gm. (0.107 mol) of 4-nitro-6-chloromethyl-phenol, which were obtained by chloromethylation of p-nitrophenol by the method described in Organic Synthesis 20, 59 (1940), were introduced in small portions into 60 cc. of fuming nitric acid which had been cooled to —5° C. and had 1 gm. of urea dissolved therein, accompanied by stirring. The resulting solution was stirred for three hours at —5° C. and was thereafter poured over 300 gm. of ice. The aqueous mixture was allowed to stand for about ten minutes, during which time a crystalline precipitate formed. The precipitate was separated by vacuum filtration, dried and recrystallized from a mixture of benzene and gasoline. 22.7 gm. (0.0977 mol; 91.2% of theory) of 2,4-dinitro-6-chloromethyl-phenol having a melting point of 93–95° C. were obtained.

EXAMPLE 2

20.0 gm. (0.107 mol) of 4-nitro-6-chloromethyl-phenol were introduced over the course of 30 minutes into 120 gm. of 50% nitric acid (0.95 mol HNO₃) at 40° C. After the initially vigorous reaction had subsided, the reaction mixture was maintained for fifteen minutes at 60° C. Thereafter, the reaction mixture was cooled to room temperature and then 30 gm. of ice were added in order to precipitate the reaction product completely. A few minutes later the solid precipitate was separated by vacuum filtration and dried. 23.3 gm. (1.00 mol; 94% of theory) of raw 2,4-dinitro-6-chloromethyl-phenol were obtained, which had a melting point of 91–94° C. After recrystallization from a mixture of benzene and gasoline and reaction product had a melting point of 93–95° C.

Substantially quantitative yields of the reaction product were also obtained when the reaction mixture was exteriorly cooled to about 0° C. instead of adding ice.

While the present invention has been illustrated with the aid of certain specific embodiments, it will be readily apparent to others skilled in the art that the invention is not limited to these particular embodiments, and that various changes and modifications may be made without departing from the spirit of the invention or the scope of the appended claims.

We claim:

1. The method of preparing 2,4-dinitro-6-chloromethyl-phenol, which comprises nitrating 4-nitro-6-chloromethyl-phenol with 50% to fuming nitric acid at a temperature between —5 and 60° C., and recovering the reaction product.

2. The method of preparing 2,4-dinitro-6-chloromethyl-phenol, which comprises nitrating 4-nitro-6-chloromethyl-phenol with fuming nitric acid at a temperature of about —5° C. in the presence of urea, and recovering the reaction product.

3. The method of preparing 2,4-dinitro-6-chloromethyl-phenol, which comprises nitrating 4-nitro-6-chloromethyl-phenol with 50% nitric acid at a temperature of 40 to 60° C., and recovering the reaction product.

References Cited

Whalley, "Jour. Chem. Soc. London" (1950), pp. 2792–94.

Li et al., "Chem. Abst.," vol. 59 (1963), pp. 3801–02.

Wertheim, "Textbook of Organic Chemistry," 1947, pp. 414–416.

BERNARD HELFIN, *Acting Primary Examiner.*

LEON ZITVER, *Examiner.*

W. B. LONE, *Assistant Examiner.*